United States Patent
Stephens

(10) Patent No.: US 7,466,262 B2
(45) Date of Patent: Dec. 16, 2008

(54) POSITIONING SYSTEM WITH A SPARSE ANTENNA ARRAY

(75) Inventor: Scott Adam Stephens, Phoenix, AZ (US)

(73) Assignee: Navcom Technology, Inc., Torrance, CA (US)

( * ) Notice: Subject to any disclaimer, the term of this patent is extended or adjusted under 35 U.S.C. 154(b) by 387 days.

(21) Appl. No.: 11/103,965

(22) Filed: Apr. 11, 2005

(65) Prior Publication Data

US 2005/0270229 A1    Dec. 8, 2005

Related U.S. Application Data

(63) Continuation-in-part of application No. 10/614,097, filed on Jul. 3, 2003.

(51) Int. Cl.
*G01S 13/08*    (2006.01)
(52) U.S. Cl. .................. 342/146; 342/126; 342/188
(58) Field of Classification Search .......... 342/5, 342/126, 146, 188, 191, 463
See application file for complete search history.

(56) References Cited

U.S. PATENT DOCUMENTS

| | | | | |
|---|---|---|---|---|
| 3,268,891 | A | * | 8/1966 | Atlas .................... 342/26 R |
| 3,691,560 | A | | 9/1972 | Hammack ................ 343/113 |
| 4,104,634 | A | | 8/1978 | Gillard et al. |
| 4,213,131 | A | * | 7/1980 | Kaiser, Jr. .............. 343/844 |
| 4,700,306 | A | | 10/1987 | Wallmander ............. 364/449 |
| 4,710,020 | A | | 12/1987 | Maddox et al. |
| 4,829,442 | A | | 5/1989 | Kadonoff et al. |
| 4,873,449 | A | | 10/1989 | Paramythioti et al. |
| 5,008,678 | A | * | 4/1991 | Herman ................. 342/158 |
| 5,375,059 | A | | 12/1994 | Kyrtsos et al. |

(Continued)

FOREIGN PATENT DOCUMENTS

DE    19910715 A1    9/2000

(Continued)

OTHER PUBLICATIONS

Edelsbruneer, H., et al., "Quadratic Time Algorithm for the Minmax Length Triangulation," *Proceedings of the 32nd Annual Symposium on Foundations of Computer Science*, San Juan, Puerto Rico, 1991, pp. 414-423.

(Continued)

*Primary Examiner*—Isam Alsomiri
(74) *Attorney, Agent, or Firm*—Morgan, Lewis & Bockius LLP

(57) ABSTRACT

In one embodiment of a positioning system, a transmit element is configured to transmit at least one electromagnetic pulse having a carrier signal frequency. An antenna array with a plurality of receive elements includes at least two receive elements separated by a spacing more than a half wavelength. Each of the at least two receive elements is configured to receive a return signal over a period of time. The return signal includes a return pulse from an object within a detection area of the system. The wavelength corresponds to the carrier signal frequency of the transmitted pulse. A detector is configured to process the return signal from one receive element and the other receive element so as to isolate the return pulse received at each of the at least two receive elements and thereby determine a position of the object in relation to the system.

13 Claims, 11 Drawing Sheets

U.S. PATENT DOCUMENTS

| | | | |
|---|---|---|---|
| 5,390,125 A | 2/1995 | Sennott et al. | |
| 5,438,517 A | 8/1995 | Sennott et al. | |
| 5,483,241 A | 1/1996 | Waineo et al. | |
| 5,572,427 A | 11/1996 | Link et al. | |
| 5,610,815 A | 3/1997 | Gudat et al. | |
| 5,640,323 A | 6/1997 | Kleimenhagen et al. | |
| 5,657,226 A | 8/1997 | Shin et al. | |
| 5,657,317 A | 8/1997 | Mahany et al. | |
| 5,874,918 A | 2/1999 | Cazenecki et al. | |
| 5,933,079 A | 8/1999 | Frink | |
| 5,982,164 A | 11/1999 | Czarnecki et al. | |
| 5,982,329 A * | 11/1999 | Pittman et al. | 343/700 MS |
| 5,986,602 A | 11/1999 | Frink | |
| 6,011,974 A | 1/2000 | Cedervall et al. | |
| 6,072,421 A | 6/2000 | Fukae et al. | |
| 6,396,435 B1 * | 5/2002 | Fleischhauer et al. | 342/70 |
| 6,424,264 B1 | 7/2002 | Giraldin et al. | |
| 6,427,079 B1 | 7/2002 | Schneider et al. | |
| 6,459,966 B2 | 10/2002 | Nakano et al. | |
| 6,489,917 B2 | 12/2002 | Geisheimer et al. | |
| 6,525,688 B2 | 2/2003 | Chou et al. | |
| 6,556,942 B1 | 4/2003 | Smith | |
| 6,608,593 B2 | 8/2003 | Holt | |
| 6,720,935 B2 | 4/2004 | Lamensdorf et al. | |
| 2001/0027360 A1 | 10/2001 | Nakano et al. | |
| 2001/0051527 A1 | 12/2001 | Kuwahara et al. | |
| 2003/0005030 A1 | 1/2003 | Sutton et al. | |
| 2003/0007473 A1 | 1/2003 | Strong et al. | |
| 2004/0119633 A1 | 6/2004 | Oswald et al. | 342/70 |
| 2006/0220950 A1 * | 10/2006 | Morgan et al. | 342/165 |

FOREIGN PATENT DOCUMENTS

| | | |
|---|---|---|
| EP | 308585 A2 * | 3/1989 |
| EP | 0325539 A1 | 7/1989 |
| EP | 0961134 A1 | 12/1999 |
| WO | PCT/US2004/002136 | 12/2004 |

OTHER PUBLICATIONS

Afsar, M.N., et al., "A New Wideband Cavity-Backed Spiral Antenna," *Proceedings of the 2001 IEEE Antennas and Propogation Society Int'l Symposium*, 2001, vol. 4, pp. 124-127.

Michelson, D.G., et al., "Use of Circular Polarization in a Marin Radar Positioning System," *Remote Sensing: An Economic Tool for the Nineties*, IGARSS '89, Jul. 10-14, 1999.

Orfanidis, S.J., "Electromagnetic Waves and Antennas: Chapter 18 Antenna Arrays," ECE Dept. Rutgers Univ., Jun. 8, 2003, pp. 632-660.

International Search Report for International Application No. PCT/US2006/009834, mailed Oct. 5, 2006.

* cited by examiner

POSITIONING SYSTEM WITH A SPARSE ANTENNA ARRAY

This application is a continuation-in-part of U.S. patent application Ser. No. 10/614,097, filed Jul. 3, 2003, pending. U.S. patent application Ser. No. 10/614,097 is incorporated herein by reference in its entirety.

FIELD OF THE INVENTION

The present invention relates generally to positioning systems and more specifically, to a system and method for determining the position of an object in relation to a positioning system using a sparse antenna array.

BACKGROUND OF THE INVENTION

Local positioning systems are becoming an important enabler in mobile devices requiring navigation capabilities, especially in applications of autonomous vehicles and precision construction tools. Global positioning systems such as GPS provide only medium accuracy position information, usually no better than 10 cm, and require a clear view of the sky to near the horizon. Local positioning systems, with either active or passive components distributed in a working volume, can allow much more accurate (<1 cm) positioning, and allow the user to expand the system as necessary to operate in even the most complex enclosed geometries.

Conventional local positioning systems include acoustic and laser ranging systems. Acoustic systems typically use transponder beacons to measure range within a network of devices, some of which are fixed to form the local coordinate system. Unfortunately, because of the properties of sound propagation through air, acoustic systems can only measure range to accuracies of a centimeter or more, and only over relatively short distances. Local positioning systems based on lasers utilize measurements of both the angle and range between a device and one or more reflective objects, such as prisms, to triangulate or trilateralate the position of the device. However, laser systems currently employ expensive pointing mechanisms that can drive the system cost to $30K or more.

A relatively low-cost (≦$2000) local positioning system able to determine 2D or 3D positions to accuracies of a few millimeters would enable a large set of potential products, in such application areas as precision indoor and outdoor construction, mining, precision farming and stadium field mowing and treatment. The present invention overcomes the cost and accuracy limitations of conventional local positioning systems.

SUMMARY OF THE INVENTION

The system and method of the present invention provide a low-cost, yet highly accurate, local positioning system.

In one embodiment of the system, an antenna array with a plurality of transmit elements, including at least two transmit elements separated by a spacing more than a half wavelength, is configured to transmit at least one set of electromagnetic pulses substantially simultaneously. Each of the at least two transmit elements is configured to transmit one pulse having a respective carrier signal frequency in the set of pulses. The wavelength corresponds to an average of respective carrier signal frequencies of transmitted pulses from the at least two transmit elements.

A receiver is configured to receive a return signal over a period of time. The return signal includes at least a first return pulse and a second return pulse from an object within a detection area of the system. The first return pulse corresponds to the transmitted pulse from one transmit element and the second return pulse corresponds to the transmitted pulse from the other transmit element.

A detector is configured to process the return signal so as to isolate the first return pulse and the second return pulse and thereby determine a position of the object in relation to the system. The detector includes angular resolution logic for determining an angular position of the object in accordance with the spacing between the at least two transmit elements and directional resolution logic for determining a direction of the object in accordance with a difference in arrival times of the first return pulse and the second return pulse at the receiver.

In another embodiment of the system, a transmit element is configured to transmit at least one electromagnetic pulse having a carrier signal frequency. An antenna array with a plurality of receive elements includes at least two receive elements separated by a spacing more than a half wavelength. Each of the at least two receive elements is configured to receive a return signal over a period of time. The return signal includes a return pulse from an object within the detection area of the system. The wavelength corresponds to the carrier signal frequency of the transmitted pulse.

A detector is configured to process the return signal from one receive element and the other receive element so as to isolate the return pulse received at each of the at least two receive elements and thereby determine the position of the object in relation to the system. The detector includes angular resolution logic for determining the angular position of the object in accordance with the spacing between the at least two receive elements and directional resolution logic for determining the direction of the object in accordance with the difference in arrival times of the first return pulse and the second return pulse at the receive elements.

Additional variations on the method and apparatus embodiments are provided.

BRIEF DESCRIPTION OF THE DRAWINGS

Additional objects and features of the invention will be more readily apparent from the following detailed description and appended claims when taken in conjunction with the drawings.

Like reference numerals refer to corresponding parts throughout the several views of the drawings.

DETAILED DESCRIPTION OF THE DRAWINGS

Reference will now be made in detail to embodiments of the invention, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the present invention.

Figure 1:
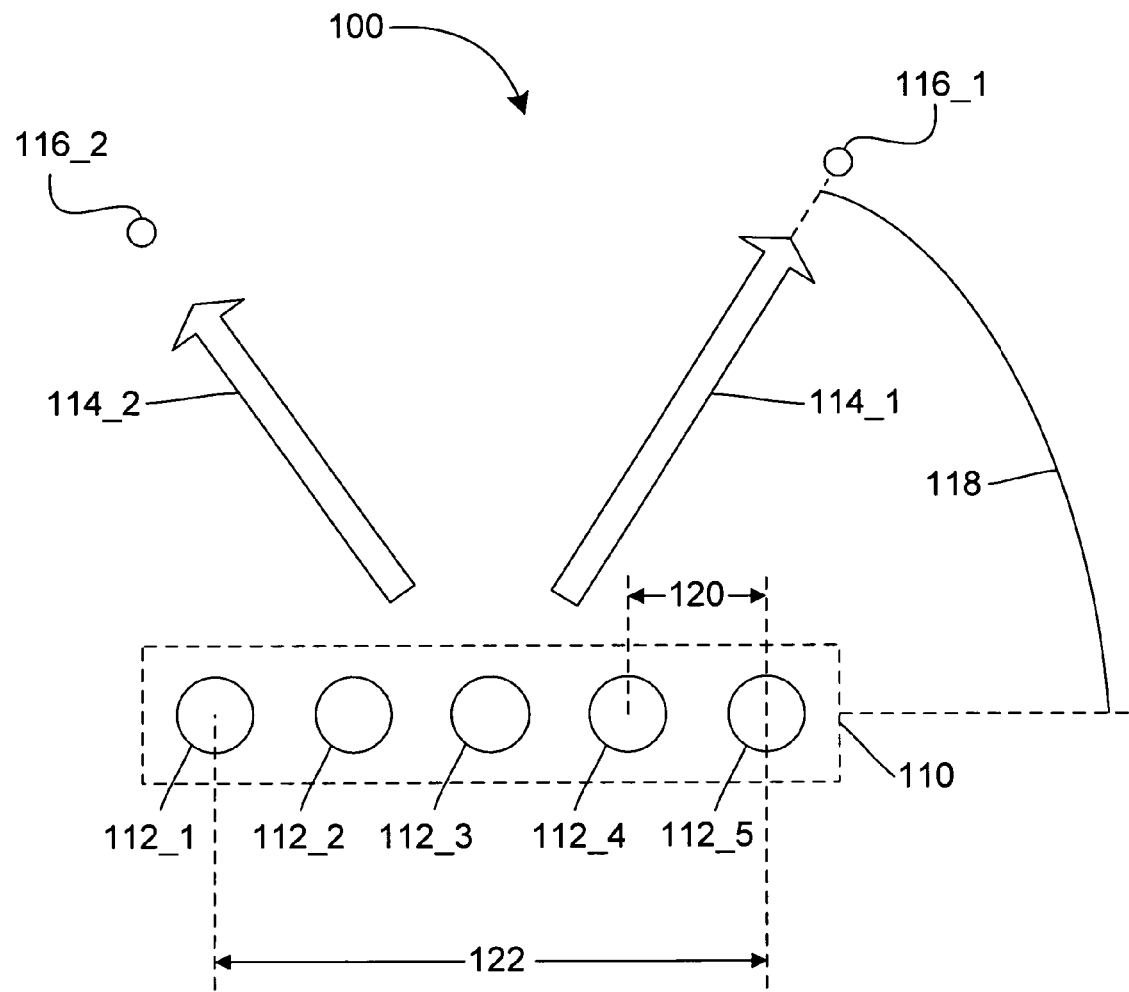
FIG. 1 is a diagram illustrating a prior art antenna array.

An existing approach to a positioning system is illustrated in FIG. 1. Positioning system 100 includes antenna array 110 having transmit elements 112. The antenna array transmits an electromagnetic beam 114_1 to an object 116_1 within a detection area of the system 100. The beam 114_1 direction has an angle θ 118 with respect to a horizontal direction collinear with the transmit elements 112. The beam 114_1 is typically continuous as a function of time, having a carrier signal with a carrier signal frequency and a corresponding wavelength λ. Such a beam is also known as continuous wave (CW). A portion of the beam 114_1 is reflected from the object 116_1. This reflected beam is detected by a receiver (not shown) in the antenna array 110 allowing a location of the object 116_1 relative to the antenna array 110 to be determined within a position resolution of the antenna array 110.

The position resolution combines a distance or range resolution and an angular resolution. The angular resolution of the antenna array 110 is determined by a variety of factors including the carrier signal wavelength λ, the angle θ 118, a minimum spacing d 120 between two adjacent transmit elements (in this case, transmit element 112_4 and transmit element 112_5) and a maximum distance 122 of the transmit elements 112. In general, for given values of these factors, the antenna array 110 with the smallest angular resolution is most desirable.

For an antenna array with equal spacing d 120 between adjacent transmit elements, such as antenna array 110, the maximum distance 122 of the transmit elements 112 is equal to a number N of transmit elements 112 times the spacing d 120 or Nd. Nd is an effective numerical aperture D of the antenna array 110. The classical Rayleigh limit on the resolving power of an imaging system, such as the CW positioning system 100, indicates that the angular resolution achieved by the effective numerical aperture of length D is proportional to λ/D. This angular resolution corresponds to a beam width of a lobe in a gain pattern for the antenna array 110. (Note that the gain pattern is proportional to a radiation intensity.) The lobe is usually a central or main lobe in the gain pattern, since this lobe usually has the largest amplitude, allowing the position of objects with small cross sections to be determined. The beam width of a respective lobe in the gain pattern is a minimum for angle θ 118 equal to 90°, i.e., broadside to the antenna array 110. As the angle θ 118 approaches 0° or 180°, the beam width—and the angular resolution corresponding to the respective lobe—increases.

Figure 2:
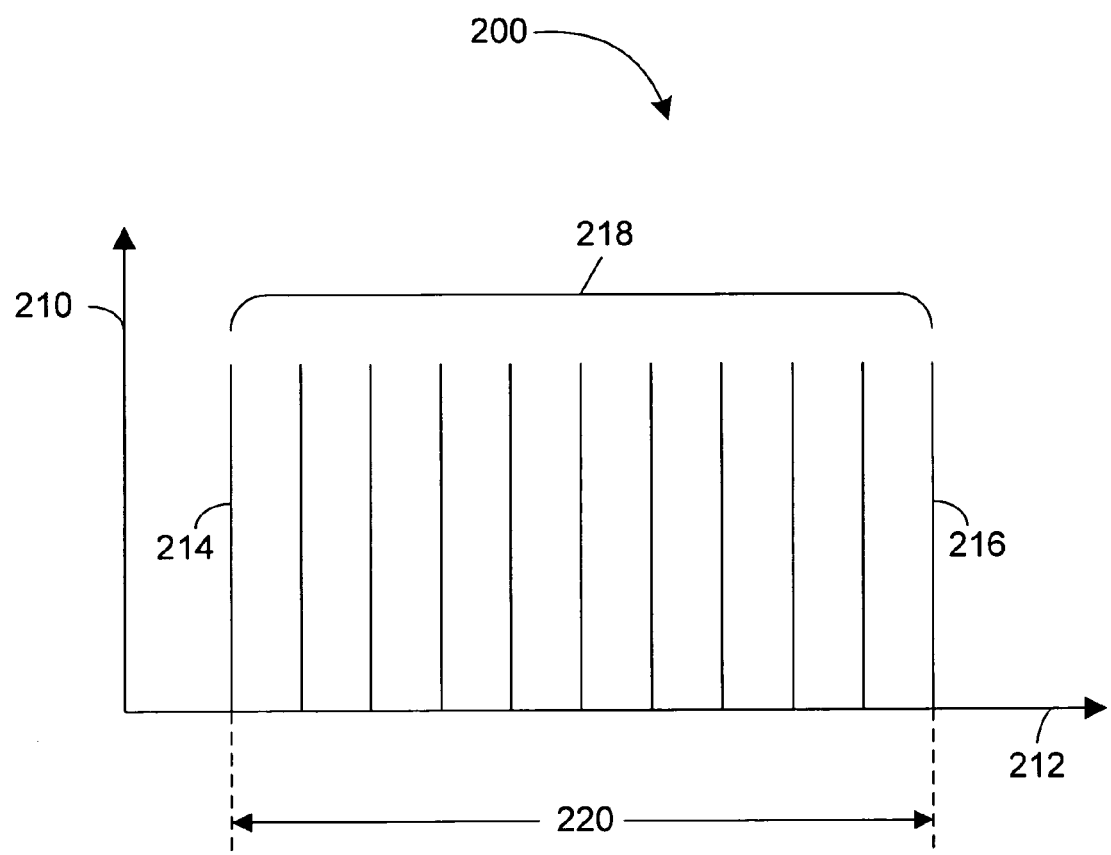
FIG. 2 illustrates samples in a prior art discrete Fourier transform.

The inverse relationship between the effective numerical aperture D and the angular resolution of the antenna array 110 can be understood by analogy with an existing discrete Fourier transform 200 illustrated in FIG. 2. Multiple time samples 218 of a signal are shown as magnitude 210 as a function of time 212. The first time sample 214 and the last time sample 216 define a time interval 220. A frequency resolution of the discrete Fourier transform 200 of the samples 218 has an inverse relationship with the time interval 220.

Referring back to FIG. 1, a phase or relative timing and/or an amplitude of transmit signals applied to different transmit elements 112 can be used to electronically steer the main lobe of the gain pattern and thereby vary the angle θ 118. Such electronic steering is analogous to amplitude modulation of time domain signals. Electronic steering is illustrated in FIG. 1 by beam 114_2 and object 116_2. There are, however, some drawbacks to electronically steering. Notably there are precise timing requirements for the transmit signals and the angular resolution increases as the angle θ 118 approaches 0° or 180°. Addressing these challenges makes electronically steering less desirable in cost-sensitive applications.

As noted by the analogy with the discrete Fourier transform 200 illustrated in FIG. 2, the discrete transmit elements 112 in the antenna array 110 also effectively spatially sample the gain pattern. The Nyquist criterion for the antenna array 110 is that the spacing d 120 is less than or equal to a half wavelength λ/2 or d≦λ/2. For d>λ/2, the gain pattern is over specified and repeats over a visible region of the antenna array 110. For the angle θ 118 equal to 90° and d>λ, this gives rise to grating lobes or fringes. For the angle θ 118 equal to 0° or 180°, the corresponding criterion is d>λ/2. Grating lobes are essentially spectral images generated in the sampling process.

Grating lobes are very narrow and allow very small angular resolution. As discussed below, however, there is a directional ambiguity associated with them. As a consequence, for CW beams 114 the antenna array 110 with spacing d 120 equal to λ/2 achieves maximum directivity, i.e., a minimum resolvable angular resolution. Antenna arrays having d>λ/2 are referred to as sparse antenna arrays.

Figure 3:
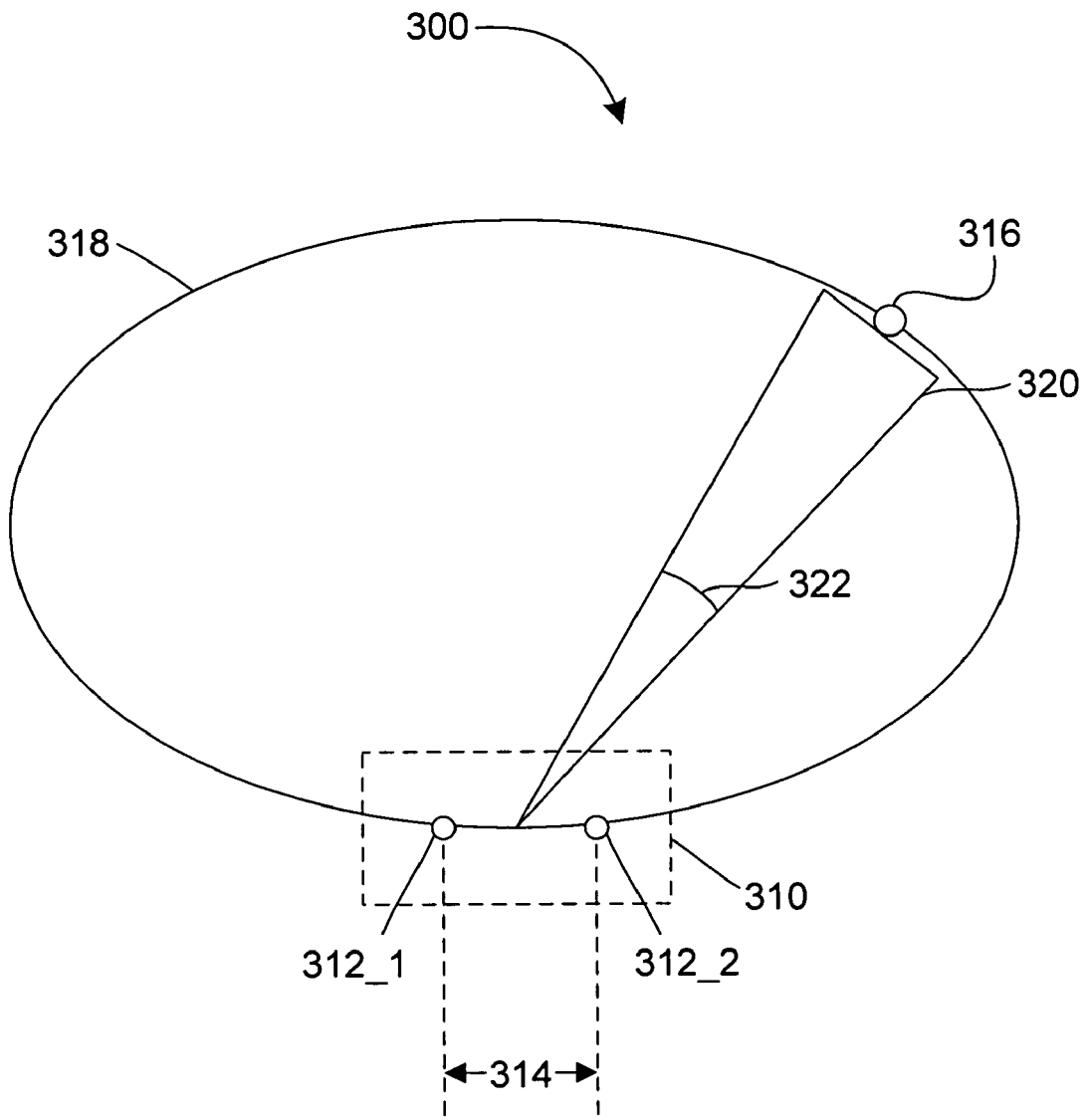
FIG. 3 illustrates a prior art antenna array.

FIG. 3 illustrates an existing positioning system 300 including an antenna array 310 having two transmit elements 312 with a spacing d 314 equal to λ/4. The effective numerical aperture N of the antenna array 310 is the same as a spacing d 314 between the transmit elements 312. The transmit array 310 has a gain pattern 318. In agreement with the Nyquist criterion, there are no grating lobes in the gain pattern 318. For an object 316 within the detection area of the system 300, the gain pattern 318 has an angular resolution 320, including angle 322, allowing the position of object 316 to be determined.

Figure 4:
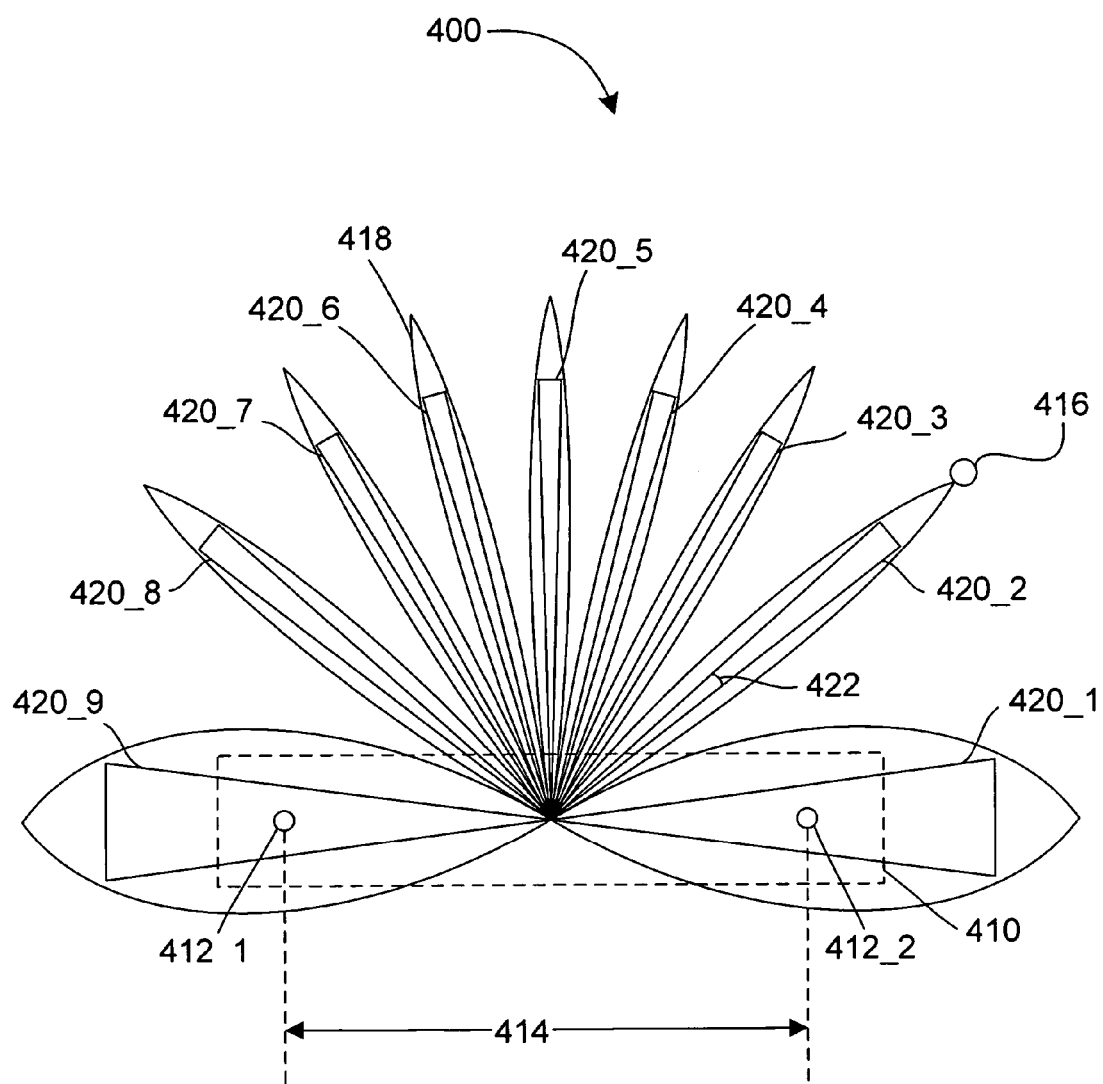
FIG. 4 illustrates a positioning system with a sparse antenna array.

FIG. 4 illustrates a positioning system 400 including an antenna array 410 having two transmit elements 412 with a spacing d 414 equal to 4λ. The spacing d 414 violates the Nyquist criterion and gives rise to a gain pattern 418 having multiple grating lobes. Note that the beam width of a respective grating lobe increases as the respective lobe approaches collinearity with the transmit elements 412. This corresponds to having the angle θ 118 (FIG. 1) approach 0° or 180°. While the grating lobes allow a small angular resolution (such as angle 422) of the position of an object 416, for CW signals the antenna array 410 is unable to distinguish signal 420_2 from other signals 420 corresponding to the other grating lobes in the gain pattern 418. As a consequence, there is a directional ambiguity in the position of the object 416.

Figure 5:
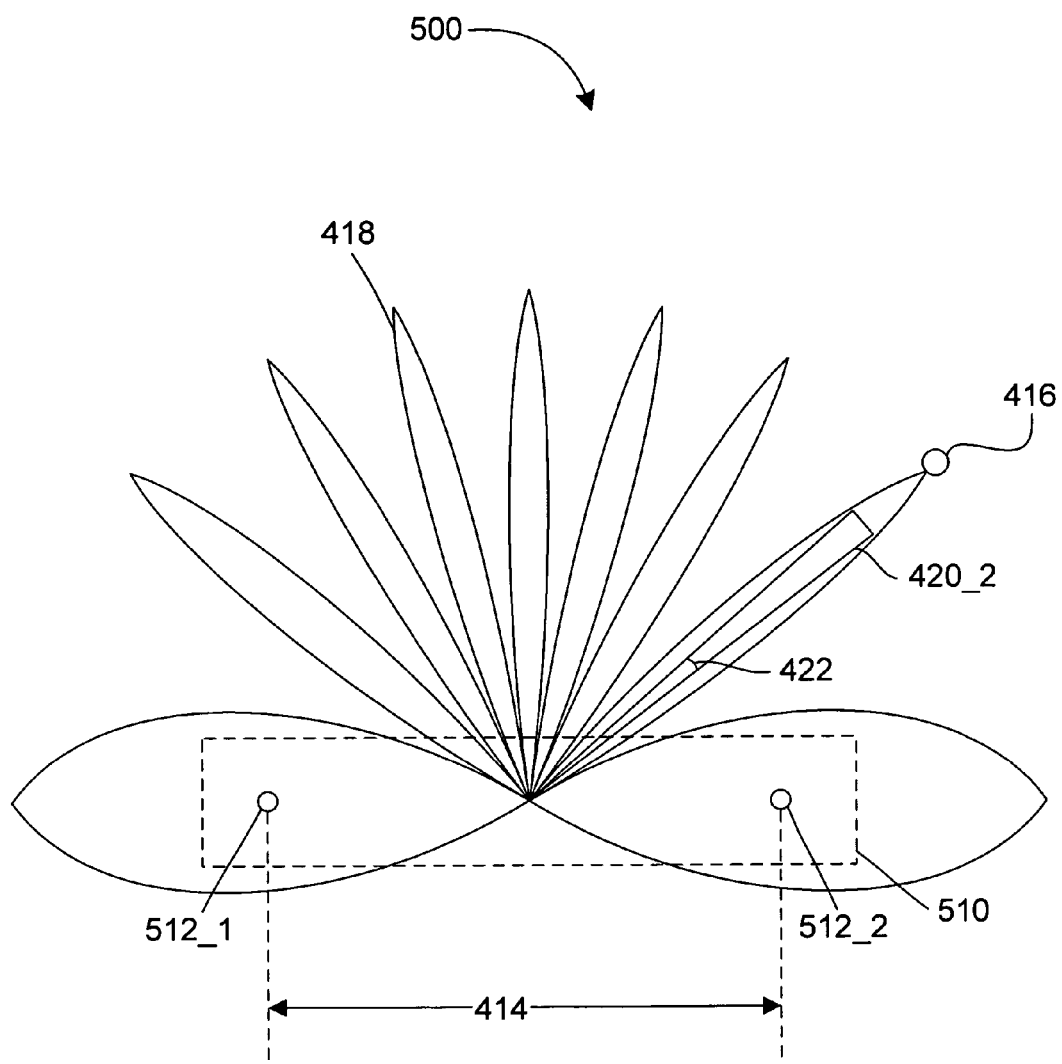
FIG. 5 illustrates an embodiment of the positioning system with the sparse antenna array.

FIG. 5 illustrates an embodiment of a positioning system 500 including a sparse antenna array 510 having two transmit elements 512 with a spacing d 414 (equal to 4λ) that violates the Nyquist criterion. The positioning system 500 resolves the directional ambiguity in the position of the object 416 by transmitting at least one set of pulses from the transmit elements 512 substantially simultaneously. Transmit elements 512 are each configured to transmit at least one pulse in the set of pulses. Each pulse has a respective carrier signal frequency, and the wavelength λ corresponds to an average of respective carrier signal frequencies of transmitted pulses from the two transmit elements 512.

By analyzing times of arrival of the pulses corresponding to those transmitted by transmit element 512 using at least one receive element (not shown), signal 420_2 corresponding to an appropriate grating lobe in the gain pattern 418, and thus to the object 416, can be determined. In particular, a time of arrival (ToA) is $$ToA = 2\frac{r}{c},$$

where r is the distance from a respective transmit element, such as the transmit element 512_1, and c is the propagation speed of electromagnetic signals. The propagation speed of electromagnetic signals c is known to be approximately $3.0*10^8$ M/S in a vacuum. In typical atmospheric conditions, the propagation speed of electromagnetic signals deviates from this value by less than 300 ppm (parts per million). By employing information about the altitude and other environmental factors, the propagation speed of electromagnetic signals in the environment of the positioning system 500 can be determined to within 100 ppm. Therefore, analysis of the time of arrival of the pulses allows distances or ranges from the transmit elements 512 to the object 516, and thus the appropriate grating lobe in the gain pattern 418, to be determined. In some embodiments, the distance or range is determined using the time or arrival of one of the pulses.

The positioning system 500 has a small angular resolution with a low-cost antenna array 510. A CW antenna array, such as antenna array 110 (FIG. 1), needs more transmit elements 112 (FIG. 1), with corresponding complexity and expense, to achieve comparable angular resolution. While the positioning system 500 has two transmit elements 512, other embodiments may have a plurality of transmit elements including at least two transmit elements 512 separated by a spacing d 414 more than the half wavelength λ/2.

Figure 11:
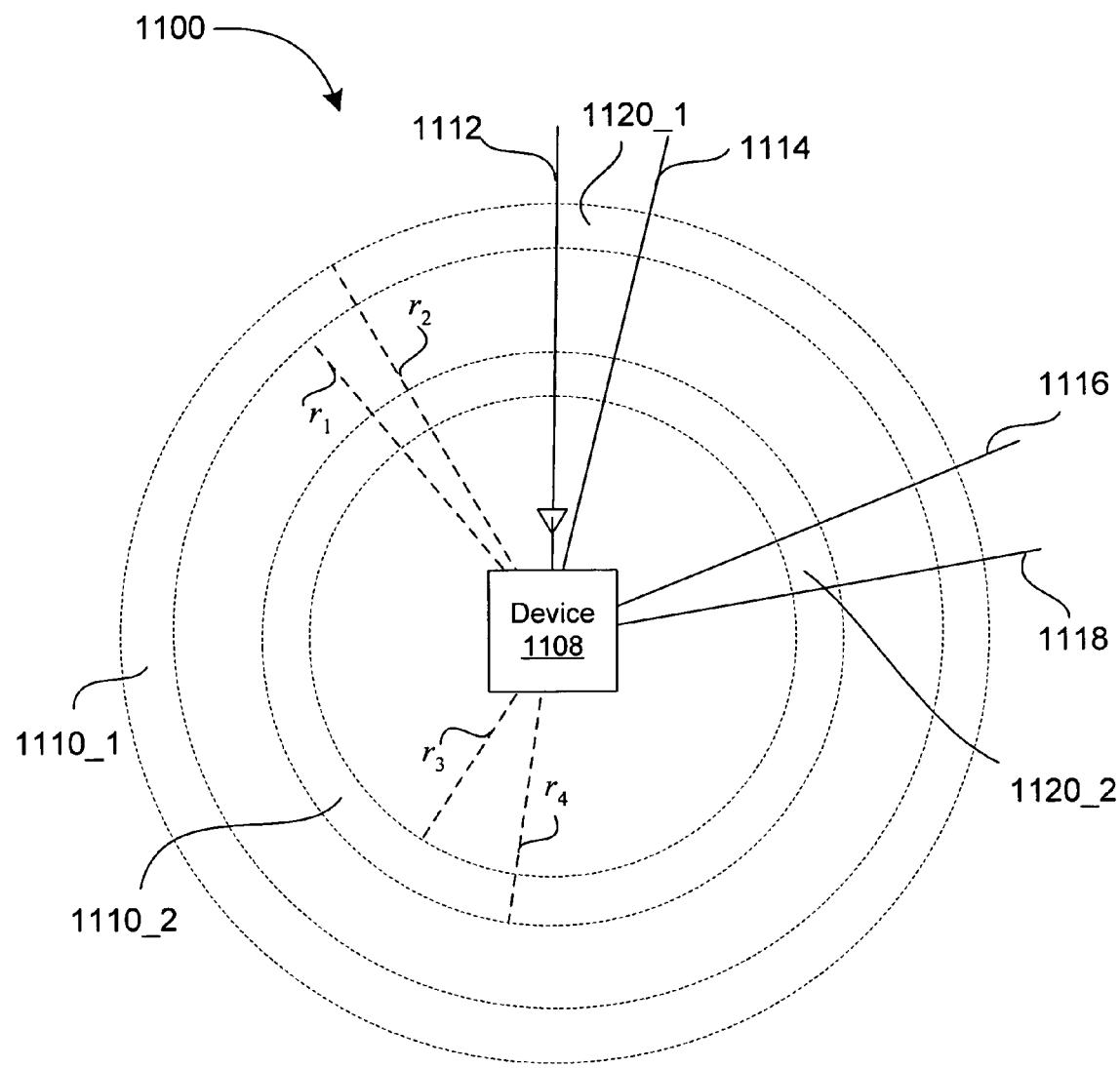
FIG. 11 illustrates the range and angular bins corresponding to positions of one or more antenna arrays relative to one or more objects.

The combination of range information and angular information between the antenna array 510 and the object 416 allows the position of the antenna array 510 to be determined. Typically, the positioning system 500 will be able to establish or determine the position with a resolution of 1 cm or better. This is illustrated in FIG. 11 for a positioning system 1100. One or more objects, such as the object 416 (FIG. 5), are in range bins 1110, defined by ranges $r_1$, $r_2$, $r_3$ and $r_4$ (determined from the time of arrival of one or more return pulses) and angular bins 1120, defined by angles 1112, 1114, 1116 and 1118. In an exemplary embodiment, the position of a device 1108, including one or more antenna array, such as the antenna array 510 (FIG. 5), may be determined with an accuracy of 1 cm or better.

Figure 6:
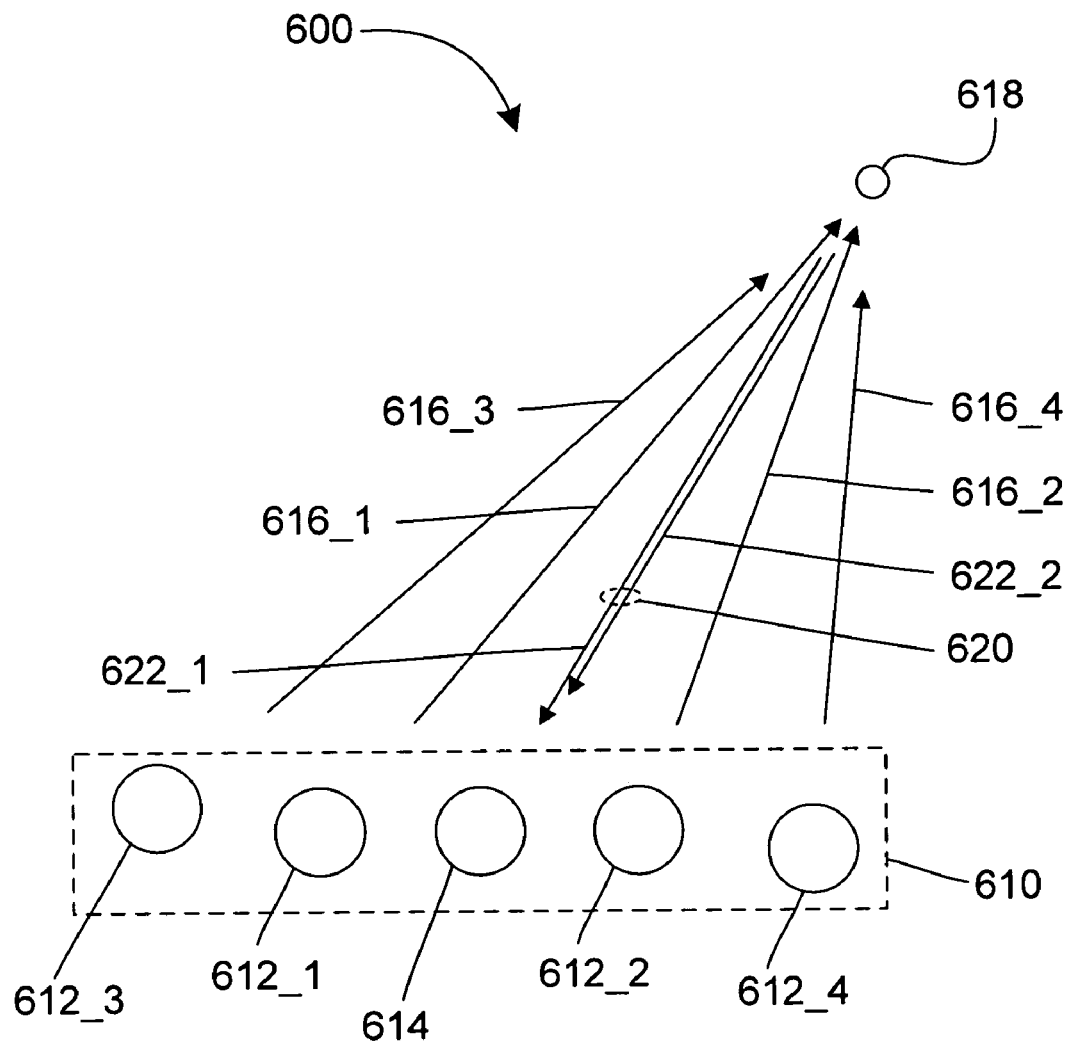
FIG. 6 illustrates an embodiment of the positioning system with the sparse antenna array.

FIG. 6 illustrates an embodiment of a positioning system 600 having a sparse antenna array 610. The antenna array 610 includes at least one receiver 614 and a plurality of transmit elements 612 including at least two transmit elements 612_1 and 612_2 separated by the spacing d (not shown) more than the half wavelength λ/2. The antenna array 610 is configured to transmit at least one set of electromagnetic pulses 616 substantially simultaneously. Each of the at least two transmit elements 612_1 and 612_2 is configured to transmit one pulse (616_1 or 616_2) in the set of pulses 616. Each pulse (616_1 and 616_2) has a respective carrier signal frequency, and the wavelength λ corresponds to an average of respective carrier signal frequencies of transmitted pulses 616_1 and 616_2 from the at least two transmit elements 612_1 and 612_2.

The receiver 614 configured to receive a return signal 620 over a period of time. The return signal 620 includes at least a first return pulse 622_1 and a second return pulse 622_2 from an object 618 within the detection area of the positioning system 600. The first return pulse 622_1 corresponds to the transmitted pulse 616_1 from transmit element 612_1 and the second return pulse 622_2 corresponds to the transmitted pulse 616_2 from transmit element 612_2.

A detector (not shown) in the positioning system 600 is configured to process the return signal 620 so as to isolate the first return pulse 622_1 and the second return pulse 622_2 and thereby determine the position of the object 618 in relation to the positioning system 600. The detector includes angular resolution logic for determining the angular position of the object 618 in accordance with the spacing d between the at least two transmit elements 612_1 and 612_2, and directional resolution logic for determining the direction of the object 618 in accordance with a difference in arrival times of the first return pulse 622_1 and the second return pulse 622_2 at the receiver 614.

In some embodiments of the positioning system 600, the pulses 616_1 and 616_2 for each of the at least two transmit elements 612_1 and 612_2 are encoded differently. In some embodiments of the positioning system 600, the pulses 616_1 and 616_2 for each of the at least two transmit elements 612_1 and 612_2 have a different carrier signal phase. In some embodiments of the positioning system 600, the pulses 616_1 and 616_2 for each of the at least two transmit elements 612_1 and 612_2 have a different carrier signal frequency. In some embodiments of the positioning system 600, the pulses 616 may be distinguished by different gain profiles for the transmit elements 612, thereby modifying an amplitude of the return pulses 622 in the return signal 620.

In some embodiments of the positioning system 600, the transmit elements 612 are omni-directional. In some embodiments of the positioning system 600, the transmitted pulses 616 from each of the at least two transmit elements 612 have a polarization and the receiver 614 preferentially receives return signals 620 having the polarization. The polarization includes linear polarization, elliptical polarization, right-hand elliptical polarization, left-hand elliptical polarization, right-hand circular polarization and left-hand circular polarization.

In some embodiments of the positioning system 600, the object 618 is a passive reflector. In some embodiments of the positioning system 600, the object 618 is an active landmark. The active landmark transmits a return pulse corresponding to one or more pulses 616 transmitted by the antenna array 610.

In some embodiments of the positioning system 600, the antenna array 610 includes a third transmit element 612_3 that is not collinear with the first two transmit elements 612_1 and 612_2. The third transmit element 612_3 is configured to transmit a pulse 616_3 having a respective carrier signal frequency. In some embodiments of the positioning system 600, the antenna array 610 includes a fourth transmit element 612_4 that is not co-planar with other transmit elements 612_1, 612_2 and 612_3. The fourth transmit element 612_4 is configured to transmit a pulse 616_4 having a respective carrier signal frequency. In an exemplary embodiment of the positioning system 600, the transmit elements 612 are arranged in a tetrahedron. In other embodiments of the positioning system 600, additional transmit elements 612 and/or additional receivers, such as receiver 614, are included in the antenna array 610.

The non-collinear third transmit element 612_3 and/or the non-coplanar fourth transit element 612_4 allow determination of angles to the object 618 in three dimensions. For example, if the positions of three transmit elements 612 that are not collinear are known, it is possible to determine the position of the object 618 unambiguously from knowledge of the range from the object 618 to each of the transmit elements 612. Alternatively, if the transmit elements 612 are not co-planar, the use of four transmit elements 612 with known positions will allow the unambiguous determination of the position of the object 618 from knowledge of the range from the object 618 to each of the transmit elements 612. Algorithms for the determination of position based on one or more ranges are well-known to one of skill in the art. See, for example "Quadratic time algorithm for the minmax length triangulation," H. Edelsbruneer and T. S. Tan, pp. 414-423 in Proceedings of the 32nd Annual Symposium on Foundations of Computer Science, 1991, San Juan, Puerto Rico, hereby incorporated by reference in its entirety.

The respective carrier signal frequencies, and the corresponding wavelength, may be in a radio frequency band, a ultra-high frequency band, a very high frequency band or a microwave frequency band.

Figure 7:
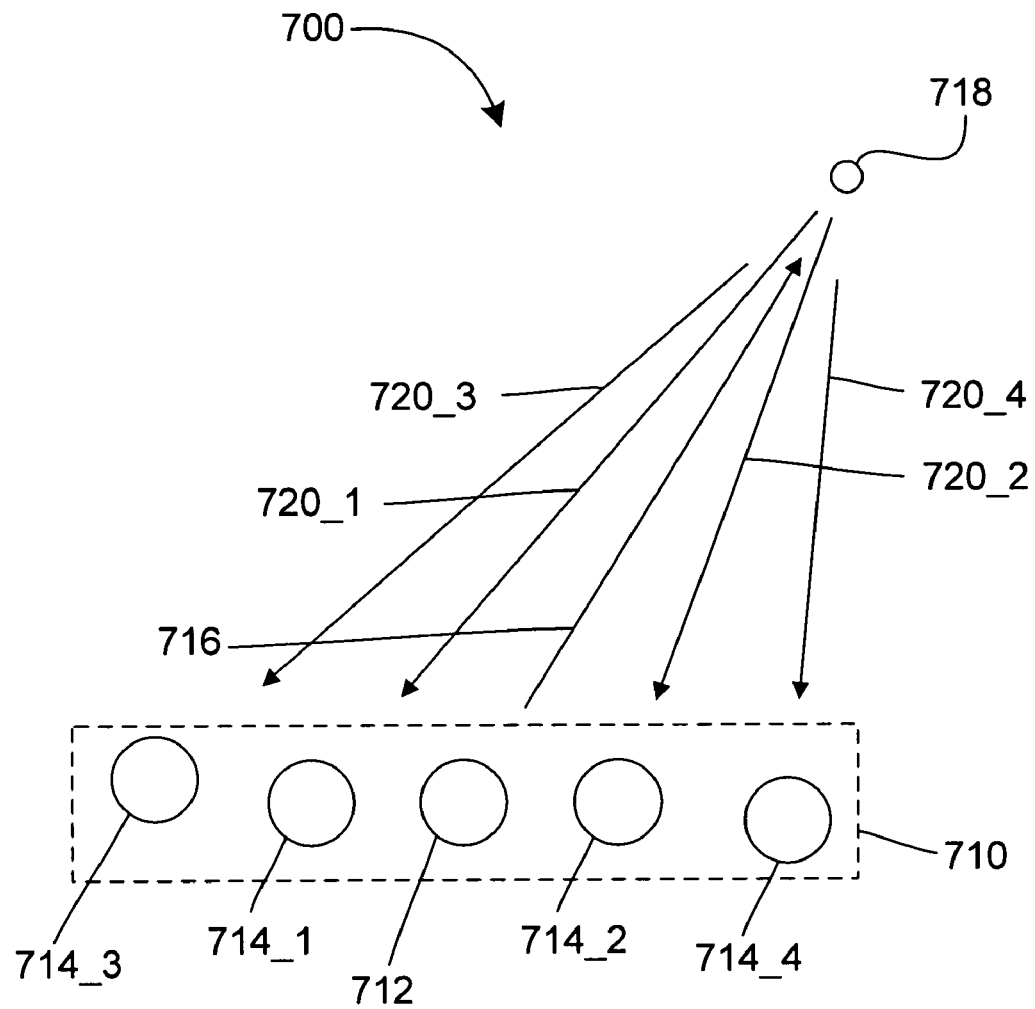
FIG. 7 illustrates an embodiment of the positioning system with the sparse antenna array.

Based on a reciprocity principle, an embodiment with one transmit element and at least two receive elements separated by the spacing d more than the half wavelength $\lambda/2$ may also implement the positioning system. This is illustrated in the embodiment of the positioning system 700 in FIG. 7. An antenna array 710 has a transmit element 712 transmitting at least one electromagnetic pulse 716 having the carrier signal frequency and the wavelength $\lambda$. The antenna array 710 has a plurality of receive elements 714 including at least two receive elements 714_1 and 714_2 separated by the spacing d (not shown) more than the half wavelength $\lambda/2$. Each of the at least two receive elements 714_1 and 714_2 is configured to receive a return signal 720_1 and 720_2 over a period of time, the return signals 720_1 and 720_2 including a return pulse from an object 718 within the detection area of the positioning system 700.

A detector (not shown) in the positioning system 700 is configured to process the return signals 720_1 and 720_2 from one receive element 714_1 and the other receive element 720_2, respectively, so as to isolate the return pulse received at each of the at least two receive elements 714_1 and 714_2, and thereby determine a position of the object 718 in relation to the positioning system 700. The detector includes angular resolution logic for determining the angular position of the object 718 in accordance with the spacing d between the at least two receive elements 714_1 and 714_2, and directional resolution logic for determining the direction of the object 718 in accordance with a difference in arrival times of the first return pulse and the second return pulse at the receive elements 714_1 and 714_2, respectively. The distance or range to the object 718 may also be determined based on the arrive times of one or more return pulse.

In some embodiments of the positioning system 700, the transmit element 712 is omni-directional. In some embodiments of the positioning system 700, the one or more transmitted pulse 716 from the transmit element 712 has a polarization and the receivers 714 preferentially receive return signals 720 having the polarization. The polarization includes linear polarization, elliptical polarization, right-hand elliptical polarization, left-hand elliptical polarization, right-hand circular polarization and left-hand circular polarization.

In some embodiments of the positioning system 700, the object 718 is a passive reflector. In some embodiments of the positioning system 700, the object 718 is an active landmark.

In some embodiments of the positioning system 700, the antenna array 710 includes a third receive element 714_3 that is not collinear with the first two receive elements 714_1 and 714_2. The third receive element 714_3 is configured to receive a signal 720_3 including a pulse having the carrier signal frequency. In some embodiments of the positioning system 700, the antenna array 710 includes a fourth receive element 717_4 that is not co-planar with other receive elements 714_1, 714_2 and 714_3. The fourth receive element 714_4 is configured to receive a signal 720_4 including a pulse having the carrier signal frequency. In an exemplary embodiment of the positioning system 700, the receive elements 714 are arranged in a tetrahedron. In other embodiments of the positioning system 700, additional transmit elements, such as transmit element 712, and/or additional receivers 714 are included in the antenna array 710.

As discussed previously for the positioning system 600, the non-collinear third receive element 714_3 and/or the non-coplanar fourth receive element 714_4 allow determination of angles to the object 718 in three dimensions.

Figure 8:
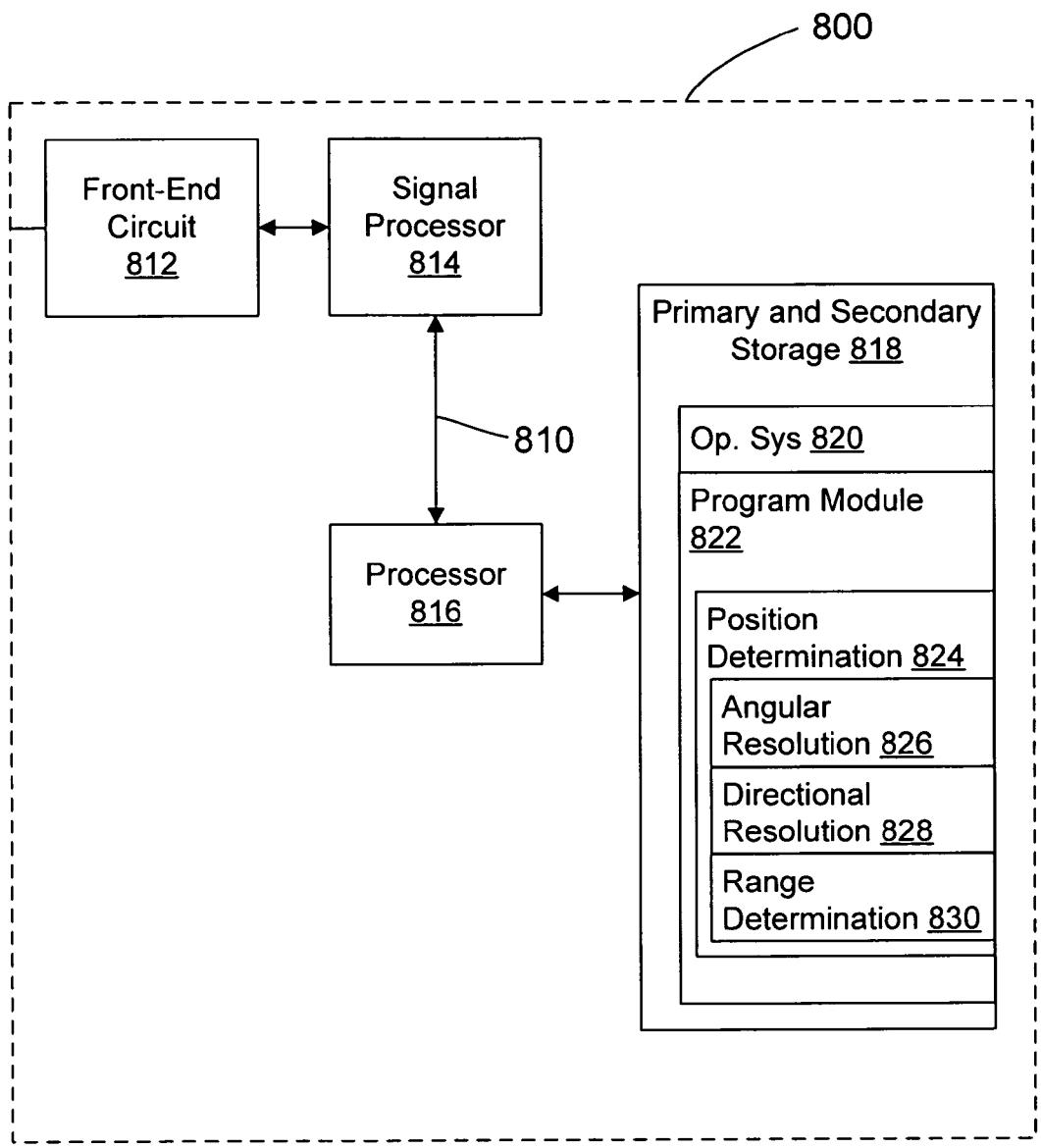
FIG. 8 is an illustration of typical components in an embodiment of the positioning system with the sparse antenna array.

FIG. 8 illustrates an embodiment of a detector 800 suitable for use in embodiments 600 and 700 of the positioning system. The detector 800 includes a front-end circuit 812 and a signal processor 814 for modifying one or more signals. The modifying may include amplification, filtering and/or removal of modulation coding. The detector 800 includes one or more processing units (CPUs) 816, a memory device with primary and secondary storage 818, and one or more communications buses 810 for connecting these components. In alternate embodiments, some or all of the functionality of the detector 800 may be implemented in one or more application specific integrated circuits (ASICs), thereby either eliminating the need for the processing unit 816 or reducing the role of the processing unit 816. The memory device 818 may include high speed random access memory and may also include non-volatile memory, such as one or more magnetic disk storage devices. The memory device 818 may include mass storage that is remotely located from the processing unit 816.

The memory device 818 stores an operating system 820 that includes procedures for handling various basic system services for performing hardware dependent tasks. The memory device 818 also stores one or more program modules 822. The program module 822 includes position determination module 824 to determine the position of one or more objects within the detection area of the positioning system, such as positioning systems 600 and 700. The position determination module 824 includes angular resolution module 826, directional resolution module 828 and range determination module 830. The directional resolution module 828 determines the appropriate grating lobe in the gain pattern corresponding to the object.

The modules in the memory device 818 are executed by the processing unit 816. In addition, the detector 800 may include executable procedures, sub-modules, tables and other data structures (not shown). In some embodiments, additional or different modules and data structures may be used and some of the modules and/or data structures listed above may not be used. In some embodiments, the capabilities of the detector 800 may be implemented more in hardware and less in software, or less in hardware and more in software, as is known in the art.

Figure 9:
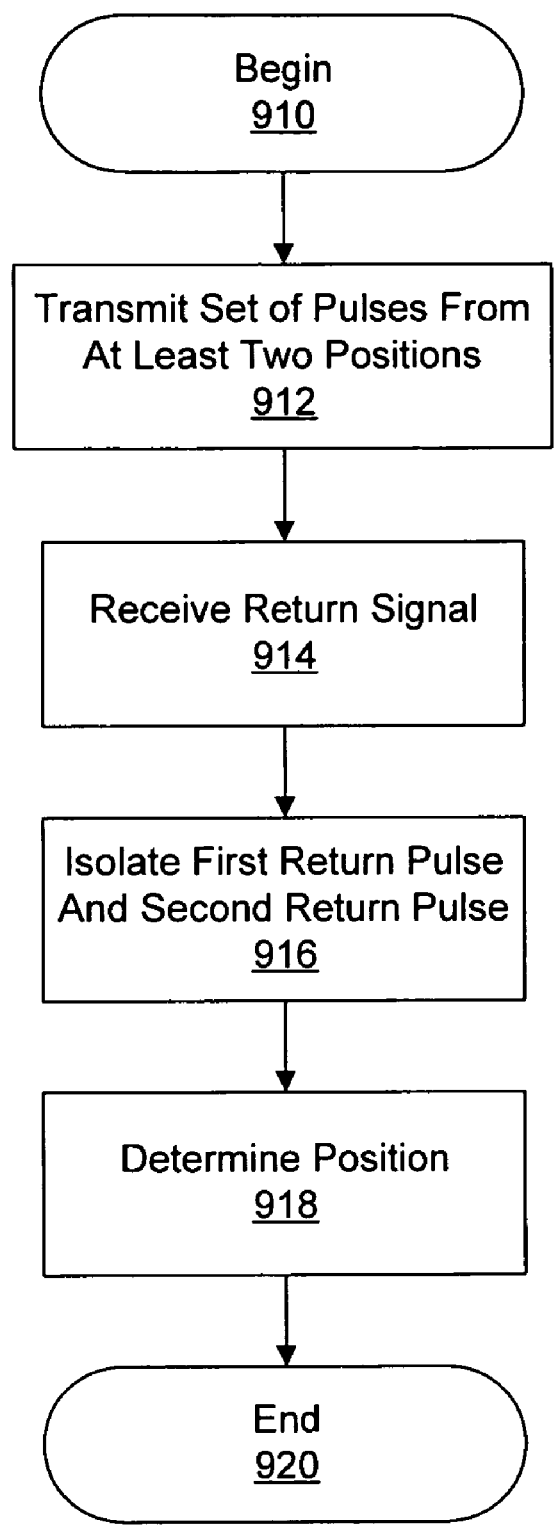
FIG. 9 is a flow chart of the operations performed with an embodiment of the positioning system with the sparse antenna array.

FIG. 9 is a flow chart of the operations performed with an embodiment of the positioning system with the sparse antenna array. After beginning 910, at least one set of electromagnetic pulses is transmitted 912 substantially simultaneously from a plurality of positions, including at least two transmit positions separated by the spacing d more than the half wavelength $\lambda/2$. The wavelength $\lambda$ corresponds to an average of respective carrier signal frequencies of the pulses in the set of pulses.

A return signal is received 914 over a period of time. The return signal includes at least the first return pulse and the second return pulse from the object within the detection area of the system. The first return pulse corresponds to one transmitted pulse in the set of pulses and the second return pulse corresponds to another transmitted pulse in the set of pulses. The return signal is processed so as to isolate 916 the first return pulse and the second return pulse. A position, including an angular resolution and a directional resolution, of the object is determined 818 and the procedure ends 920. In some embodiments, the distance or range is determined based on the time of arrival of one or more return pulse. The angular resolution is determined in accordance with the spacing d between the at least two transmit positions and the directional resolution is determined in accordance with the difference in arrival times of the first return pulse and the second return pulse.

Figure 10:
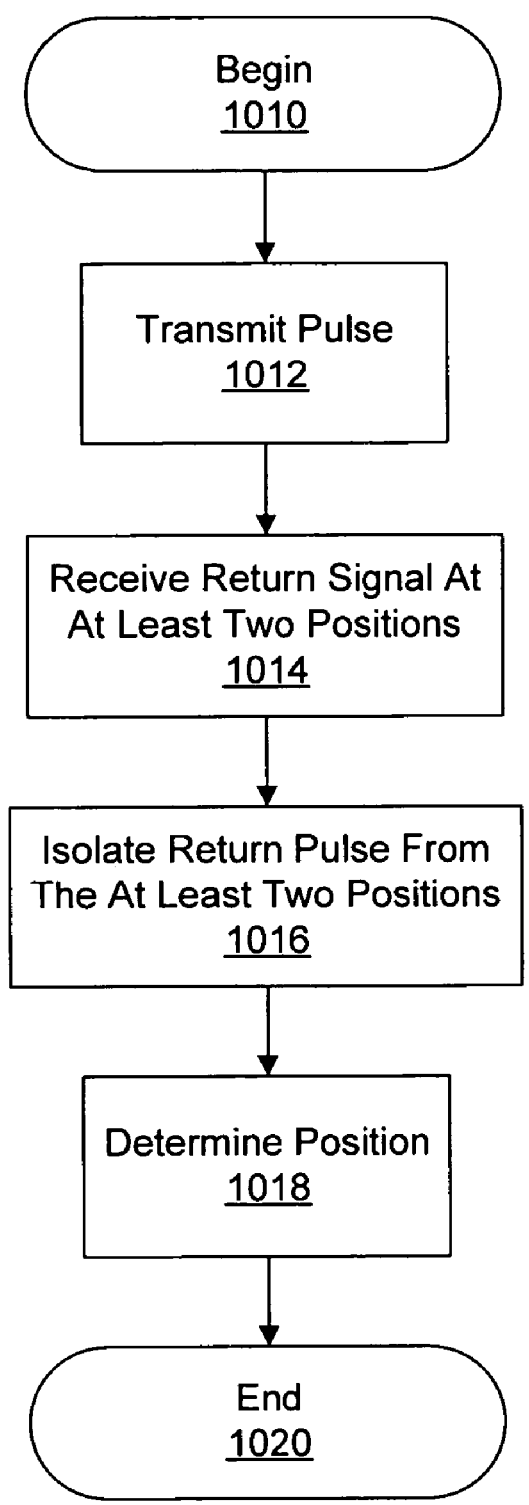
FIG. 10 is a flow chart of the operations performed with an embodiment of the positioning system with the sparse antenna array.

FIG. 10 is a flow chart of the operations performed with an embodiment of the positioning system with the sparse antenna array. After beginning 1010, at least one electromagnetic pulse is transmitted 1012. The pulse has a carrier signal frequency and the wavelength $\lambda$. A return signal is received 1014 over a period of time at a plurality of positions including at least two receive positions separated by the spacing d more than the half wavelength $\lambda/2$. The return signal includes a return pulse from the object within the detection area of the system.

The return signal is processed so as to isolate 1016 the return pulse from the return signal received at each of the at least two receive positions. A position, including an angular resolution and a directional resolution, of the object is determined 1018 and the procedure ends 1020. In some embodiments, the distance or range is determined based on the time of arrival of one or more return pulse. The angular resolution is determined in accordance with the spacing d between the at least two receive positions and the directional resolution is determined in accordance with a difference in arrival times of the return pulse at the receive positions.

In some embodiments, a method of determining the position of an object in relation to a positioning system includes transmitting at least one set of electromagnetic pulses substantially simultaneously from a plurality of positions including at least two transmit positions separated by a spacing more than a half wavelength and receiving a return signal over a period of time. The wavelength corresponds to an average of respective carrier signal frequencies of the pulses in the set of pulses. The return signal includes at least a first return pulse and a second return pulse from the object within a detection area of the system. The first return pulse corresponds to the one transmitted pulse in the set of pulses and the second return pulse corresponds to another transmitted pulse in the set of pulses. The method further includes processing the return signal so as to isolate the first return pulse and the second return pulse and determining a position, with an angular resolution and a directional resolution, of the object. The angular resolution is determined in accordance with the spacing between the at least two transmit positions and the directional resolution is determined in accordance with a difference in arrival times of the first return pulse and the second return pulse.

The transmit pulses from the at least two transmit positions may be encoded differently. The transmit pulses from the at least two transmit positions may have different carrier signal phases. The transmit pulses from the at least two transmit positions may have different carrier signal frequencies.

The transmitting of the at least two transmit pulses may be omni-directional. The at least two transmit pulses may have a polarization and receiving preferentially receives return signals having the polarization.

The polarization may be selected from linear polarization, elliptical polarization, right-hand elliptical polarization, left-hand elliptical polarization, right-hand circular polarization and/or left-hand circular polarization.

In some embodiments, the object may be a passive reflector. In some embodiments, the object may be an active landmark.

The method may further include transmitting a third pulse having a respective carrier frequency from a third transmit position that is non-collinear with the first two transmit positions.

The method may further include transmitting a fourth pulse having a respective carrier frequency from a fourth transmit positions that is not co-planar with other transmit positions.

In another embodiments, a method of determining the position of an object in relation to a positioning system includes transmitting at least one electromagnetic pulse having a carrier signal frequency and receiving a return signal over a period of time at a plurality of positions including at least two receive positions separated by a spacing more than a half wavelength. The return signal includes a return pulse from an object within a detection area of the system and the wavelength corresponds to the carrier signal frequency of the transmitted pulse. The method further includes processing the return signal so as to isolate the return pulse from the return signal received by each of the at least two receive positions and determining a position, with an angular resolution and a directional resolution, of the object. The angular resolution is determined in accordance with the spacing between the at least two receive positions and the directional resolution is determined in accordance with a difference in arrival times of the return pulse at the receive positions.

The transmitting of the transmit pulse may be omni-directional.

The transmit pulse may have a polarization and receiving may preferentially receives return signals having the polarization. The polarization may be selected from linear polarization, elliptical polarization, right-hand elliptical polarization, left-hand elliptical polarization, right-hand circular polarization and/or left-hand circular polarization.

In some embodiments, the object is a passive reflector. In some embodiments, the object is an active landmark.

The method may further include receiving the return signal at a third receive position that is non-collinear with the first two receive positions.

The method may further include receiving the return signal at a fourth receive position that is not co-planar with other receive positions.

The foregoing description, for purposes of explanation, used specific nomenclature to provide a thorough understanding of the invention. However, it will be apparent to one skilled in the art that the specific details are not required in order to practice the invention. The embodiments were chosen and described in order to best explain the principles of the invention and its practical applications, to thereby enable others skilled in the art to best utilize the invention and various embodiments with various modifications as are suited to the particular use contemplated. Thus, the foregoing disclosure is not intended to be exhaustive or to limit the invention to the precise forms disclosed. Many modifications and variations are possible in view of the above teachings.

It is intended that the scope of the invention be defined by the following claims and their equivalents.

What is claimed:

1. A positioning system, comprising:
    an antenna array with a plurality of transmit elements including at least two transmit elements separated by a spacing more than a half wavelength and configured to transmit at least one set of electromagnetic pulses substantially simultaneously,
    wherein each of the at least two transmit elements is configured to transmit one pulse in the set of pulses, each pulse having a respective carrier signal frequency, and the wavelength corresponds to an average of respective carrier signal frequencies of transmitted pulses from the at least two transmit elements, such that the antenna array transmits the electromagnetic pulses in a spatial pattern with grating lobes having an associated resolvable angular resolution;
    a receiver configured to receive a return signal over a period of time, the return signal including at least a first return pulse and a second return pulse from an object within a detection area of the system, wherein the first return pulse corresponds to the transmitted pulse from one transmit element and the second return pulse corresponds to the transmitted pulse from the other transmit element; and
    a detector configured to process the return signal so as to isolate the first return pulse and the second return pulse and thereby determine a position of the object in relation to the system,
    wherein the detector includes angular resolution logic for determining the resolvable angular resolution of the grating lobes in accordance with the spacing between the at least two transmit elements and directional resolution logic for determining a direction of the object in accordance with a difference in arrival times of the first return pulse and the second return pulse at the receiver, including determining a grating lobe in the spatial pattern corresponding to the return signal.

2. The system of claim 1, wherein the pulse from each of the at least two transmit elements is encoded differently.

3. The system of claim 1, wherein the pulse from each of the at least two transmit elements has a different carrier signal phase.

4. The system of claim 1, wherein the pulse from each of the at least two transmit elements has a different carrier signal frequency.

5. The system of claim 1, wherein the transmit elements are omni-directional.

6. The system of claim 1, wherein the transmitted pulse from each of the at least two transmit elements has a polarization and the receiver preferentially receives return signals having the polarization.

7. The system of claim 6, wherein the polarization is selected from the group consisting of linear polarization, elliptical polarization, fight-hand elliptical polarization, left-hand elliptical polarization, fight-hand circular polarization and left-hand circular polarization.

8. The system of claim 1, wherein the object is a passive reflector.

9. The system of claim 1, wherein the object is an active landmark.

10. The system of claim 1, farther comprising a third transmit element that is non-collinear with the first two transmit elements, wherein the third transmit element is configured to transmit a pulse having a respective carrier signal frequency.

11. The system of claim 10, further comprising a fourth transmit element that is not co-planar with other transmit elements, wherein the fourth transmit element is configured to transmit a pulse having a respective carrier signal frequency.

12. The system of claim 1,
    wherein the object is a landmark; and
    wherein the receiver is part of the antenna array.

13. The system of claim 1,
    wherein the object is a landmark;
    wherein the receiver is part of the antenna array; and
    wherein the position of the object in relation to the system is determined with resolution of better than 1 cm.

* * * * *

UNITED STATES PATENT AND TRADEMARK OFFICE
CERTIFICATE OF CORRECTION

PATENT NO. : 7,466,262 B2  Page 1 of 1
APPLICATION NO. : 10/103965
DATED : December 16, 2008
INVENTOR(S) : Scott Adam Stephens It is certified that error appears in the above-identified patent and that said Letters Patent is hereby corrected as shown below:

Column 12, line 17, please delete "fight-hand" and insert -- right-hand --

Column 12, line 18, please delete "fight-hand" and insert -- right-hand --

Signed and Sealed this

Twenty-fourth Day of February, 2009

JOHN DOLL
*Acting Director of the United States Patent and Trademark Office*

UNITED STATES PATENT AND TRADEMARK OFFICE
CERTIFICATE OF CORRECTION

PATENT NO.        : 7,466,262 B2
APPLICATION NO.   : 11/103965
DATED             : December 16, 2008
INVENTOR(S)       : Scott Adam Stephens Page 1 of 1

It is certified that error appears in the above-identified patent and that said Letters Patent is hereby corrected as shown below:

Column 12, line 17, please delete "fight-hand" and insert -- right-hand --

Column 12, line 18, please delete "fight-hand" and insert -- right-hand --

This certificate supersedes the Certificate of Correction issued February 24, 2009.

Signed and Sealed this

Twelfth Day of May, 2009

JOHN DOLL
*Acting Director of the United States Patent and Trademark Office*